(No Model.)
S. CEDZO.
ANIMAL TRAP.
No. 573,761.    Patented Dec. 22, 1896.
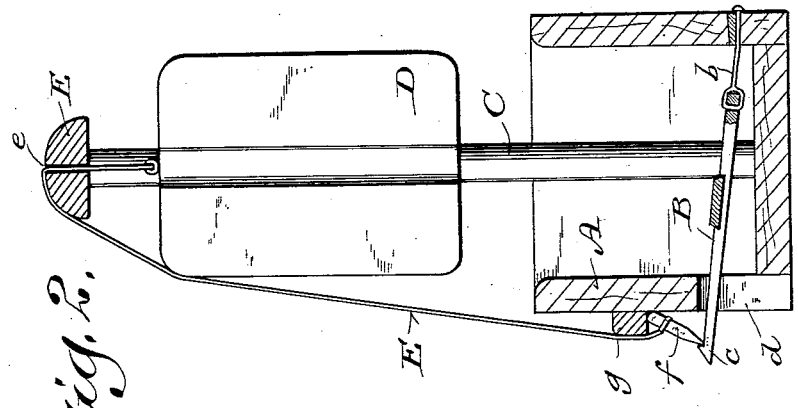
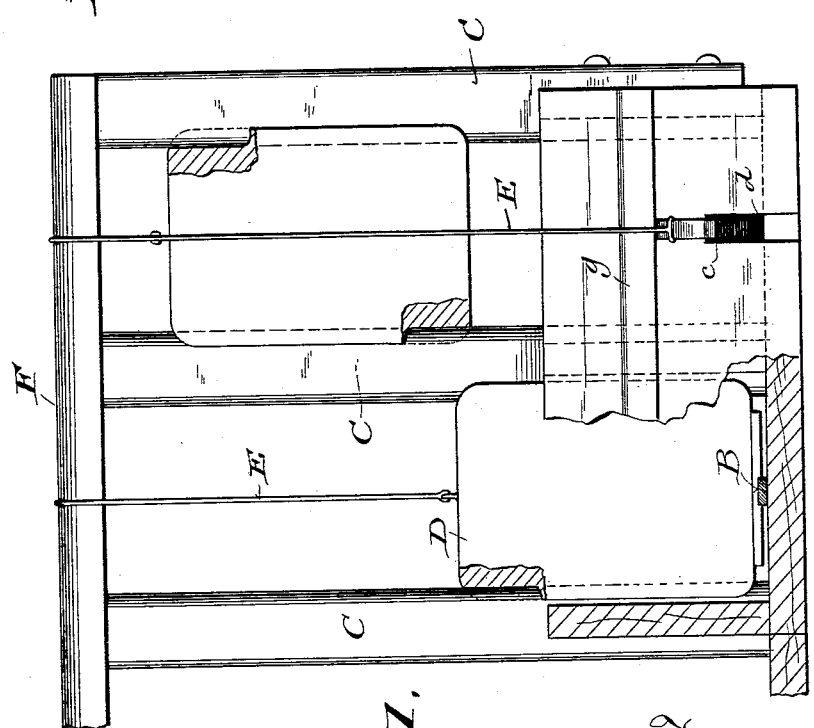

UNITED STATES PATENT OFFICE.

STEFAN CEDZO, OF MILWAUKEE, WISCONSIN, ASSIGNOR OF ONE-HALF TO MARTIN CEDZO, OF SAME PLACE.

ANIMAL-TRAP.

SPECIFICATION forming part of Letters Patent No. 573,761, dated December 22, 1896.

Application filed January 6, 1896. Serial No. 574,473. (No model.)

*To all whom it may concern:*

Be it known that I, STEFAN CEDZO, a citizen of the United States, and a resident of Milwaukee, in the county of Milwaukee and State of Wisconsin, have invented certain new and useful Improvements in Animal-Traps; and I do hereby declare that the following is a full, clear, and exact description thereof.

My invention has for its object to provide a simple, economical, and effective animal-trap; and it consists in certain peculiarities of construction and combination of parts hereinafter set forth with reference to the accompanying drawings and subsequently claimed.

In the drawings, Figure 1 represents an elevation of an animal-trap constructed according to my invention and having parts thereof broken away. Fig. 2 represents a transverse section of the trap.

Referring by letter to the drawings, A represents a pen of any suitable dimensions, this pen being open at the top. By means of a cord *b* one end of a trigger B, preferably in the form of a cross, is connected to a wall of the pen inside the latter, and the other or catch end of the trigger extends out through a vertical slot *d* in another wall of said pen adjacent to the bottom of the same. The cross shape of the trigger and its flexible connection with the pen renders said trigger extremely sensitive when set.

Rising from the pen are standards C, that serve as guides for a vertically-grooved suitable weight D, and a recurved cord, wire, or chain E, joined to the weight, is run through a vertical opening *e* in a beam F, connecting the standards.

Connected to the outer end of the cord, wire, or chain E is a finger *f*, and the weight D being elevated this finger is set obliquely under a horizontal rib *g* or other suitable stop on the outside of the slotted pen-wall, the trigger B being lifted and engaged with said finger to thereby sustain said weight in elevated position.

In practice bait is placed in the bottom of the pen, and a mouse or rat entering said pen at the open top will depress the trigger B, thereby freeing the weight D, the latter operating on its descent to kill the animal.

It is to be understood that victims can only enter the pen from the top.

The parts above specified may be multiplied indefinitely in one structure, and I have shown a plurality of triggers, guides, weights, flexible weight-hangers, and catch-fingers in connection with a box divided into a plurality of pens and provided with an outer horizontal rib under which to set said fingers.

Each trap may be accompanied with bent-wire pincers for the removal of animals crushed in the pen or pens.

Having now fully described my invention, what I claim as new, and desire to secure by Letters Patent, is—

The combination of a pen accessible from the top and having a wall thereof provided with a vertical slot and an exterior horizontal rib, a cross-shaped trigger in the pen, a cord connecting one end of the trigger with a wall of the pen opposite said slot through which the other end of said trigger extends, standards rising from said pen, a horizontal beam connecting the standards and provided with a vertical opening, a recurved flexible weight-hanger run through the opening in the beam, and a catch attached to the weight-hanger for arrangement under said pen-rib to engage the outer end of said trigger.

In testimony that I claim the foregoing I have hereunto set my hand, at Milwaukee, in the county of Milwaukee and State of Wisconsin, in the presence of two witnesses.

STEFAN CEDZO.

Witnesses:
N. E. OLIPHANT,
B. C. ROLOFF.